United States Patent [19]

Copa et al.

[11] Patent Number: 4,810,386

[45] Date of Patent: Mar. 7, 1989

[54] TWO-STAGE WASTEWATER TREATMENT

[75] Inventors: William M. Copa, Wausau; Thomas J. Vollstedt, Schofield, both of Wis.

[73] Assignee: Zimpro/Passavant Inc., Rothschild, Wis.

[21] Appl. No.: 140,651

[22] Filed: Jan. 4, 1988

[51] Int. Cl.⁴ ............................................... C02F 3/12
[52] U.S. Cl. ..................................... 210/616; 210/626; 210/628; 210/631; 210/744
[58] Field of Search ............... 210/610, 616, 623, 624, 210/626, 628, 629, 631, 694, 618, 732-736, 744

[56] References Cited

U.S. PATENT DOCUMENTS

| | | | |
|---|---|---|---|
| 3,524,547 | 8/1970 | Nicol | 210/134 |
| 3,803,029 | 4/1974 | Blecharczyk | 210/618 |
| 3,904,518 | 9/1975 | Hutton et al. | 210/616 |
| 3,957,632 | 5/1976 | Knopp et al. | 210/616 |
| 3,980,556 | 9/1976 | Besik | 210/616 |
| 4,069,148 | 1/1978 | Hutton et al. | 210/616 |
| 4,076,615 | 2/1978 | Olesen et al. | 210/616 |
| 4,167,479 | 9/1979 | Besik | 210/626 X |
| 4,172,781 | 10/1979 | Walk et al. | 210/626 |
| 4,292,176 | 9/1981 | Grutsch et al. | 210/624 X |
| 4,468,327 | 8/1984 | Brown et al. | 210/626 |
| 4,479,876 | 10/1984 | Fuchs | 210/616 X |
| 4,500,429 | 2/1985 | Reimann et al. | 210/616 |
| 4,623,464 | 11/1986 | Ying et al. | 210/626 X |
| 4,663,044 | 5/1987 | Goronszy | 210/610 |

OTHER PUBLICATIONS

"Biophysical Treatment of Landfill Leachate Containing Organic Compounds" *Proceedings of Industrial Waste Conference,* 1986, (Pub. 1987), 41st, 167–177 (Sheila F. McShane, James M. Montgomery, Consulting Engineers, Inc.; Alon Lebel, BKK Corp., T. E. Pollock, James M. Montgomery, Consulting Engineers, Inc., Bryan A. Stirrat, Bryan A. Stirrat and Associates, Consulting Civil Engineers).

*Journal Water Pollution Control Federation,* vol. 51, No. 2, Feb. 1979, pp. 274–287. (Mervyn C. Goronszy).

Primary Examiner—Tom Wyse
Attorney, Agent, or Firm—Michael, Best & Friedrich

[57] ABSTRACT

A two-stage process for purifying wastewater containing organic and adsorbable pollutants includes the steps of first aerating the wastewater in the presence of a powdered adsorbent, such as activated carbon, and biologically active solids in the aeration zone of a primary treatment zone which also includes a quiescent zone. The thus-treated water passes from the aeration zone to the quiescent zone where it is retained a sufficient time for a substantial portion of the suspended solids to settle by gravity. The partially-treated wastewater overflowing from the quiescent zone is introduced into one or more contact zones wherein it is agitated, preferably by aeration, in the presence of a powdered adsorbent, agitation is terminated and the solids are allowed to settle by gravity and, after completion of settling, clarified, substantially solids-free water is withdrawn from each contact zone.

22 Claims, 2 Drawing Sheets

TWO-STAGE WASTEWATER TREATMENT

BACKGROUND OF THE INVENTION

1. Field of the Invention

This invention relates to two-stage processes for purifying wastewater containing organic and adsorbable pollutants and, more particularly, to such processes including a biophysical treatment first stage and an adsorbent contact treatment second stage.

2. Related Prior Art

The problem of water pollution is widely recognized and has resulted in local, state and federal regulations. In response to these regulations, as well as in the Public interest, various treatment methods have been developed to remove the pollutants found in wastewater.

The quantity of pollutants in wastewater is commonly determined by measuring the amount of dissolved oxygen required to biologically decompose the waste organic matter in polluted water. This measurement, called biochemical oxygen demand (BOD), provides an index of the organic pollution of water. Some organic contaminants, such as chlorinated aromatics, are not amenable to conventional biological decomposition and tests such as chemical oxygen demand (COD) and total organic carbon (TOC) have been employed to measure the concentration of these compounds.

A particularly useful process for removing pollutants from wastewater employs a mixture of bacteria and powdered activated carbon in a treatment zone. This process, called the PACT TM treatment system, is disclosed in Hutton et al., U.S. Pat. Nos. 3,904,518 and 4,069,148. The PACT treatment system operates as a continuous flow process with an aeration basin followed by a separate clarifier to separate biologically active solids and carbon from the treated wastewater and the settled sludge is returned to the aeration basin.

A slightly different biophysical treatment process is described by McShane et al., in "Biophysical Treatment of Landfill Leachate Containing Organic Compounds" *Proceedings of Industrial Waste Conference,* 1986 (Pub. 1987), 41st, 167-77. In this process a biological batch reactor is used with powdered activated carbon and the system is operated in the "fill and draw" mode, also known as the sequenced batch reactor (SBR) mode. A similar scheme for treatment of leachate is disclosed in Ying et al., U.S. Pat. No. 4,623,464 in which a SBR is operated with both biologically active solids and carbon present to treat PCB and a dioxin-containing leachate.

Another single-vessel method of biological wastewater treatment is the Intermittent Cycle Extended Aeration System (ICEAS) described by Goronszy in *Journal Water Pollution Control Federation,* Vol. 51, No. 2, February, 1979, pp. 274-287.

Brown et al., U.S. Pat. No. 4,468,327 discloses a singl vessel biological treatment process, known as extended aeration, in which a single vessel fitted with at least one inlet baffle continuously receives influent and intermittently aerates, settles and decants biologically treated effluent.

Nicol, U.S. Pat. No. 3,524,547 discloses a sewage treatment plant which includes an inlet compartment and two treatment compartments. Sewage from the inlet compartment is transferred substantially continuously from the inlet compartment into a first treatment compartment, from the first treatment compartment to a second treatment compartment and treated sewage is removed from the second treatment compartment. The flow is then reversed, flow being from the inlet compartment to the second treatment compartment, to the first compartment and finally from the system. Thus, the two treatment compartments alternately serve as the first and second treatment stages.

Goronszy, U.S. Pat. No. 4,663,044 discloses a continuous inflow, activated sludge treatment process employing three zones for biological adsorption and biological degradation. Activated sludge contacts wastewater in a separate first zone to adsorb biodegradable dissolved compounds. The sludge wastewater mixture passes to interconnected second and third zones where aeration and settling are followed by decanting of biologically treated effluent.

These different straight biological treatment methods often do not produce a treated wastewater of suitable quality for discharge to the environment. Likewise, the use of a mixture of biologically active solids and powdered activated carbon in the same system may be incapable of Producing adequate treatment to meet discharge requirements for wastewaters containing compounds which are difficult to biodegrade and only weakly adsorbed on carbon.

SUMMARY OF THE INVENTION

An object of the invention is to provide a two-stage process for purifying wastewater containing organic and adsorbabl Pollutants, which employs aeration of the wastewater in the presence of a powdered adsorbent and biologically active solids in the first stage and additional treatment with a powdered adsorbent in a second stage, without the need for clarifying equiPment to separate the adsorbent from the effluent.

Another object of the invention is to provide such a Process which is capable of producing improved removal of pollutants.

A further object of the invention is to provide such a process wherein settling times in the second stage can be varied to maximize separation of solids.

Other asPects, advantages and objects of the invention will become apparent to those skilled in the art upon reviewing the following detailed description, the drawings and the appended claims.

The invention provides a two-stage wastewater treatment process in which the wastewater is first treated in a primary treatment zone including an aeration zone wherein the wastewater is continuously aerated with an oxygen-containing gas in the presence of a powdered adsorbent, preferably activated carbon, and biologically active solids to remove a major portion of the pollutants and then treated in a contact zone wherein it is agitated with a powdered adsorbent to further remove pollutants. The primary treatment zone includes a quiescent zone substantially isolated from the aeration zone and the initially treated wastewater passes from the aeration zone to the quiescent zone where it is retained a sufficient time for a substantial Portion of the mixed liquor solids therein to settle by gravity to produce a first aqueous phase and a first solids phase.

The first aqueous phase is transferred, preferably continuously, to the contact zone wherein it is agitated, preferably by aeration with a pressurized oxygen-containing gas, in the presence of a powdered adsorbent for an agitation period sufficient to reduce the pollutants to a desired level. After termination of the agitation period, the solids in the thus-treated first aqueous Phase are allowed to settle by gravity for a settling period sufficient to produce a clarified, substantially solids-free, second aqueous phase and a second solids phase. A predetermined amount of the second aqueous phase is thereafter withdrawn from the contact zone and these fill, agitate, settle and draw steps are then repeated in the contact zone.

A flocculant aid for promoting settling of solids preferably can be added near the end of the agitation period. All or a portion of the second solids phase can be recycled to the aeration zone of the primary treatment zone and a portion of the mixed liquor solids can be withdrawn from the primary treating zone to maintain the amounts of adsorbent and biologically active solids present in the aeration zone at predetermined levels.

In one embodiment, the contact zone comprises a single tank including a turbulent inlet section and a mixing and settling section. The first aqueous phase continuously flows from the primary treatment zone into the turbulent inlet section at a first flow rate and passes therefrom into the mixing and settling section where the agitation and settling steps are carried out. After completion of the settling step, the clarified second aqueous phase is withdrawn from the mixing and settling section at a second flow rate greater than the first flow rate until a predetermined amount of the second aqueous phase has been withdrawn. The fill and agitate, settle and draw steps are then repeated.

In another embodiment, the contact zone comprises a plurality of tanks, the first aqueous phase flows from the primary treatment zone into one of the tanks for a predetermined fill period, then into a different one of the tanks for the Predetermined fill period and this sequence is repeated. The agitation step is carried out in each tank during and/or after the filling period and, after completion of the settling period, a predetermined amount of the clarified second aqueous phase is withdrawn from each tank before the flow of the first aqueous phase from the primary treatment zone is again commenced.

DESCRIPTION OF THE PREFERRED EMBODIMENTS

Figure 1:
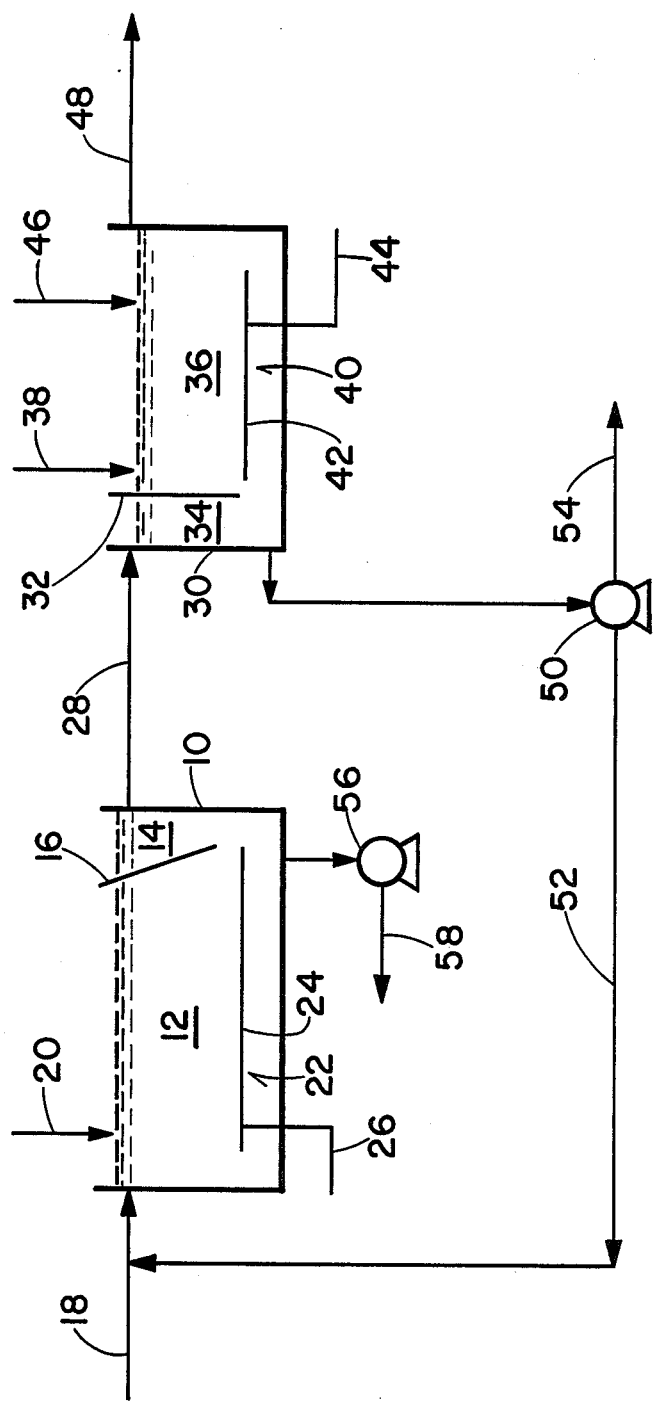
FIG. 1 is a schematic flow diagram of one embodiment of the invention in which the contact zone comprises a single tank.

Referring to FIG. 1, a wastewater containing organic and adsorbable pollutants is introduced into a primary treatment zone or tank 10 including an aeration zone 12 and a quiescent zone 14 substantially isolated from and in continuous fluid communication with the aeration zone 12. In the specific embodiment illustrated, the primary treatment zone is a single tank which is divided into an aeration zone 12 and a quiescent zone 14 by a baffle 16 having a lower edge spaced upwardly from the tank bottom.

If the wastewater contains an excessive amount of solids, it can be clarified by settling, decantation or filtration to reduce the solids content prior to treatment in the primary treatment zone 10. The clarified or unclarified wastewater is introduced via a conduit 18 into the aeration zone 12 wherein it is continuously aerated with a pressurized oxygen-containing gas, such as air, in the presence of sufficient amounts of a powdered adsorbent and biologically active solids to reduce the BOD, COD, TOC and adsorbable pollutants to desired levels. The operating conditions for and the additives present in the aerating zone 12 generally can be the same as described in Hutton et al., U.S. Pat. Nos. 3,904,518 and 4,069,148 which are incorporated herein by reference.

The adsorbent must be finely divided and readily dispersible in an aqueous medium. Various adsorbents useful in purifying wastewaters can be used. Suitable adsorbents include powdered activated carbon, fuller s earth, diatomaceous earth, fly ash, coke breeze, etc., with powdered activated carbon being preferred. The adsorbent can be added to the aeration zone 12 in any suitable manner, for example, as an aqueous slurry introduced through a conduit 20.

The amount of adsorbent present in the aeration zone 12 varies, depending primarily on the nature of the wastewater and the degree of treatment desired, i.e., the desired resulting levels of BOD, COD and TOC. Generally, this amount usually is about 50 to about 5,000 milligrams of adsorbent per liter of wastewater. However, some more toxic wastewater require up to as much as 20,000 milligrams of adsorbent per liter of wastewater and adsorbent concentrations as low as 5 milligrams per liter of wastewater are effective for some less toxic wastewaters.

The biologically active solids present in the aeration zone 12 are suspended solids containing different types of bacteria formed by contacting wastewater, bacteria and oxygen. They can be activated sludge or activated solids found in oxidation ponds and other biological water treatment processes. Generally, the amount of biologically active solids present in the aeration zone provides a total suspended solids concentration (both adsorbent and biologically active solids) of about 10 to about 50,000 parts per million wastewater.

For some wastewaters, particularly some industrial wastewaters, it may be necessary to add biologically active solids to the aeration zone 12 during start up to obtain the desired concentration thereof. The process produces its own biologically active solids which ca be recycled to the aeration zone 12 from the contact zone as described below to ensure the proper level of bacteria in the aeration zone. Once a suitable concentration of biologically active solids has been reached in the aeration zone 12, that level usually can be maintained without the external addition of the biologically active solids. The above concentration of adsorbent present in the aeration zone 12 includes fresh adsorbent added to the aeration zone as well as adsorbent recycled to the aeration zone along with biologically active solids.

The adsorbent and biologically active solids (mixed liquor solids) are continuously mixed with the wastewater by a pressurized oxygen-containing gas, such as air, introduced into the aeration zone 12 by an aeration system 22 including a sparger 24 to which the pressurized oxygen-containing gas is supplied via a conduit 26. Other suitable aeration distribution means which causes dissolution of oxygen in the mixture and produces agitation can be used. Also, this aeration may be supplemented by mechanical stirring means.

The reaction or hydraulic detention time (HDT) for the wastewater in the aeration zone 12 varies, depending primarily upon the degree of treatment required. The process preferably is carried out continuously and the flow rates of the incoming wastewater and other materials ittroduced into the aeration zone 12 are adjusted to provide a HDT within the range of about 0.5 hour up to as much as 14 days.

The aerated wastewater containing suspended adsorbent and biologically active solids passes beneath the baffle 16 into the quiescent zone 14. Since the quiescent zone 14 is substantially isolated from the aeration zone 12 by the baffle 16, there is little or no mixing therein and the suspended solids can settle by gravity to produce a first aqueous phase and a first solids phase. The first aqueous phase overflows from the quiescent zone 14 at a flow rate approximately the same as the flow rate of the incoming wastewater. The first solids phase is present only in the lower portion of the quiescent zone 14. The aeration system 22 provides sufficient mixing to prevent accumulation of solids below the quiescent zone 14.

The quiescent zone 14 is sized to retain the treated wastewater therein for a time sufficient to permit a majority of the solids to settle and only a minimum amount of solids (e.g. 1,000 milligrams of total suspended solids per liter of the first aqueous phase) remains in the first aqueous phase overflowing from the quiescent zone 14. The first aqueous phase or partially-treated wastewater overflowing from the quiescent zone 14 passes through a conduit 28 into a contact zone or tank 30 at a rate approximately the same as the flow rate of the wastewater flowing through the inlet conduit 18. The contact tank 30 includes a baffle 32 defining a turbulent inlet section 34 and a mixing and settling section 36 inside the contact tank 30. The incoming partially-treated wastewater passes from the turbulent section 34 into the mixing and settling section 36.

As the mixing and settling section 36 is being filled, fresh powdered adsorbent, which Preferably is the same as that used in the aeration zone 12 (e.g., activated carbon), is introduced via a conduit 38 into the mixing and settling section 36 and mixed with the incoming partially-treated wastewater by a suitable agitation means. Alternatively, the powdered adsorbent can be added to the turbulent inlet section 34 on a continuous basis. While the agitation means can be a mechanical stirring means, in the sPecific embodiment illustrated, it is an aeration system 40, which can be similar to the one used in the aeration basin 12, including a sparger 42 to which a pressurized oxyqen-containing gas is supplied throuqh a conduit 44. Agitation by aeration is preferred because oxygen is provided to the bacteria present in the biologically active solids carried over in the partially-treated wastewater from the primary treatment zone and enhances metabolization of pollutants present in the contact tank 30.

The amount of adsorbent added to the partially-treated wastewater in the mixing and settling section 36 varies depending primarily on the degree of treatment desired, i.e., desired maximum levels of BOD, COD and TOC in the effluent. Generally, this amount may be as low as about 10 and as much as about 10,000 milligrams of adsorbent per liter of the incoming partially-treated wastewater. Agitation is terminated after a predetermined reaction time, which can be as short as about 20 minutes and up to as much as about 24 hours, to permit the suspended solids to settle by gravity and Produce a clarified or substantially solids-free second aqueous phase and a second solids phase containing adsorbent and biologically active solids.

To accelerate settling of these solids, a flocculation aid can be added via a conduit 46 to the mixing and settling section 36. The flocculant aid preferably is added shortly before agitation is terminated in order to ensure homogeneous mixing with the partially-treated wastewater without causing premature settling of the solids. While various suitable flocculant aids can be used, cationic polymers, such as Perol 787 or Percol 788 marketed by Allied Colloids, Inc., Suffolk, Va., are preferred. These materials are high molecular weight cationic copolymers of a quaternary acrylate salt and acrylamide. The amount of flocculant aid added is sufficient to promote the desired settling of the solids, primarily the adsorbent. Generally, this amount is about 0.1 to about 10 milligrams of flocculant aid per liter of partially-treated wastewater.

The settling period can be varied to meet the requirements of the wastewater being treated. For instance, if the suspended solids are difficult to settle, the settling time can be increased as required. After completion of the settling period, a predetermined amount of the clarified second aqueous phase is withdrawn from the contact tank 30 via a conduit 48 for disposal or reuse. These fill and agitate, settle and draw steps are then repeated.

If the partially-treated wastewater continuously flows from the primary treatment zone 10 into the contact tank 30 in accordance with a preferred embodiment, the baffle 32 minimizes disturbance of the solids in the mixing and settling section 36 during the settling and draw periods by wastewater introduced into the turbulent inlet section 34. The contact tank 30 can include liquid level control means (not shown) or other suitable means for terminating agitation when the liquid level in the mixing and settling section 36 reaches a predetermined upper limit, commencing introduction of the flocculant aid when the liquid level reaches a predetermined point below the upper limit and terminating withdrawal of the clarified second aqueous phase when the liquid level drops to a predetermined lower limit.

All or a portion of the settled second solids phase (adsorbent and biologically active solids) can be withdrawn from the contact tank 30 by a pump 50 and recycled via a conduit 52 to the aeration zone 12, either by combining with the incoming wastewater (as illustrated) or added directly to the aeration zone 12, to maintain the desired concentration of total suspended solids in the aeration zone as mentioned above. If desired, all or a portion of the solids withdrawn from the contact tank 30 can be discharged via a conduit 54 to waste after dewatering or other further treatment. Withdrawal of these solids can be controlled by suitable control means which, after completion of the draw cycle, operates the pump 50 when the solids level in the contact tank 30 reaches a predetermined level.

The retention time of solids in the primary treatment zone 10 can be controlled by withdrawing a portion of the mixed liquor solids with a pump 56 or the like and discharging via a conduit 58 to waste after dewatering or other further treatment.

While the primary treatment zone 10 and the contact tank 30 are illustrated as separate units, they can share common walls. For example, the contact tank 30 can be a walled-off portion of a large aeration basin and include the appropriate controls for liquid and solids flow to provide the desired flow scheme.

Figure 2:
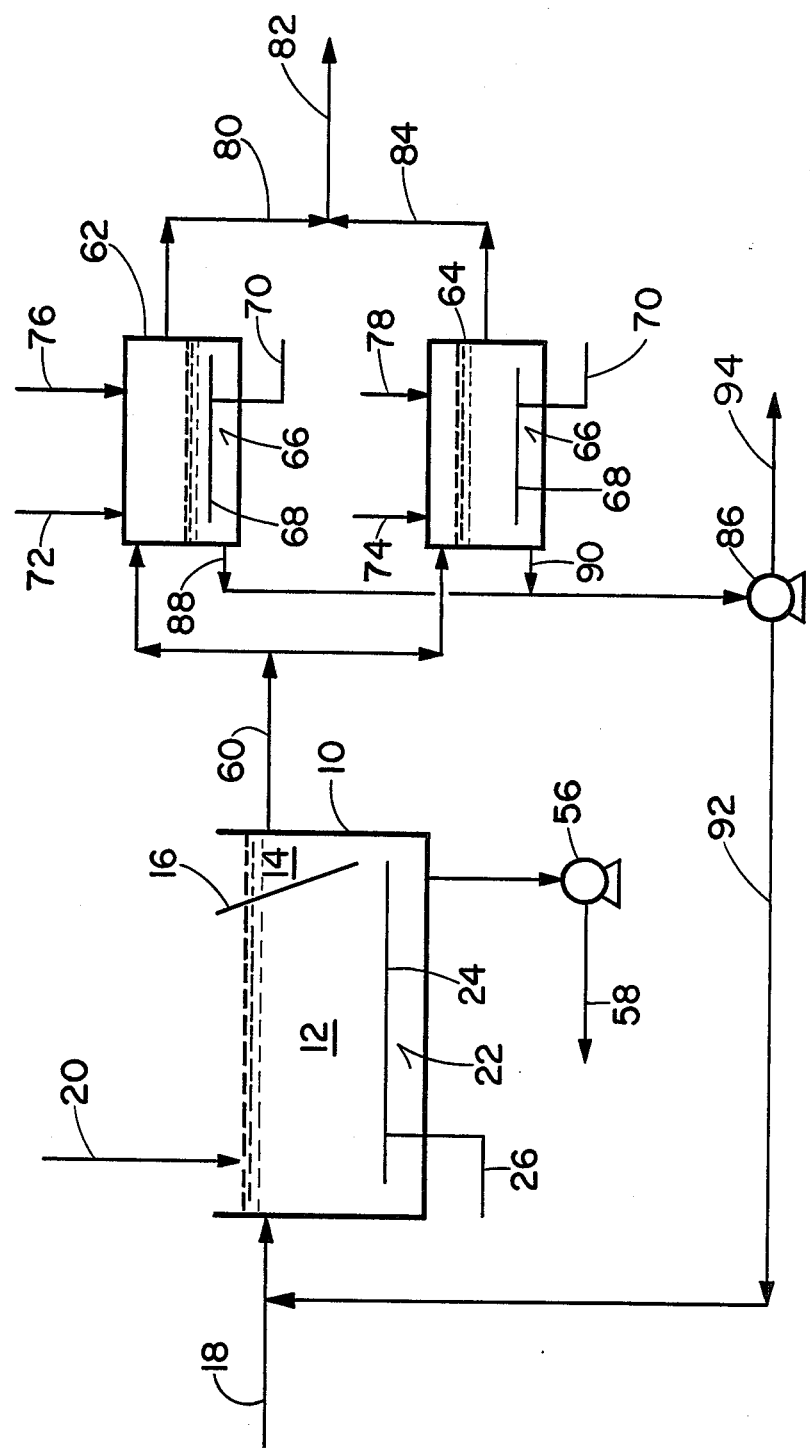
FIG. 2 is a schematic flow diagram of another embodiment of the invention in which the contact zone comprises a Plurality of tanks.

In the embodiment illustrated in FIG. 2, the primary treatment zone is arranged and operates in the same manner as described above. Accordingly, components common with those illustrated in FIG. 1 are designated with the same reference numerals.

The first aqueous phase or partially treated wastewater overflowing from the quiescent zone 14 of the primary treatment zone 10 flows through a conduit 60 and subsequently into a selected one of a plurality (e.g., two) seParate contact tanks 62 and 64. Like the contact tank 30 described above, each contact tank 62 and 64 has agitation means, such as a mechnical mixing means or an aeration system 66 including a sparger 68 to which a pressurized oxygen-containing gas is supplied via a conduit 70. A powdered adsorbent is introduced into each tank 62 and 64 through respective conduits 72 and 74 and, optionally, a flocculant aid is introduced into each tank 62 and 64 via respective conduits 76 and 78 near the end of the agitation period. The amounts of adsorbent and flocculant aid are the same as described above. Unlike the contact tank 30 described above, the contact tanks 62 and 64 do not necessarily include a baffle for defining a turbulent inlet section.

The partially-treated wastewater from the primary treatment zone 10 first flows into one of the contact tanks, for example, tank 62, for a predetermined fill period. The fill period can be controlled by suitable level control means for terminating flow into the tank 62 and diverting it to tank 64 when the liquid level in the tank 62 reaches a predetermined upper limit. The tank 64 has a similar control means for diverting the flow back to the tank 62 when the liquid level in the tank 64 reaches a predetermined upper limit. Addition of the adsorbent and agitation in each tank can be carried out during and/or after completion of the respective fill period.

Agitation, preferably by aeration as described above, is terminated after a predetermined reaction time and, if used, a flocculant aid is added shortly before termination of the agitation period. Following the agitation period in the tank 62, suspended solids are allowed to settle by gravity to produce a clarified, substantially solids-free, second aqueous phase and a second solids phase. Meanwhile, partially-treated wastewater is flowing into the other tank 64 for a predetermined fill period.

After completion of the settling period, a predetermined amount of the second aqueous Phase is withdrawn from the tank 62 via conduit 80 and 82 and disposed or reused. The tank 62 remains idle until completion of the fill period for the tank 64, at which time the partially-treated water from the primary treatment zone 10 is diverted back to the tank 62. After completion of the settling period in the tank 64, a Predetermined amount of the second aqueous phase is withdrawn through conduits 84 and 82. Suitable control means can be used to terminate withdrawal of the second aqueous phase from each tank when the liquid level drops to a predetermined lower limit. These fill, agitation, settle and draw steps are alternately repeated in each tank.

As in the embodiment described above, all or a portion of the solids can be withdrawn from the tanks 62 and 64 by a pump 86 via respective conduits 88 and 90 and recycled to the aeration zone 12 via conduit 92 or discharged via conduit 94 to waste. Withdrawal of these solids, after completion of the draw cycle in each tank, can be controlled as described above.

With this flow scheme, the process can be operated continuously and the fill periods for the tanks adjusted so that the fill, agitate, settle and draw steps for one tank can be completed before it is time to commence the fill cycle again. Thus, each tank operates as a batch unit and the agitation and settling times can be varied as required to provide the desired treatment and settling. It should be understood that three or more contact tanks can be used, if desired to provide an additional latitude in the length of the fill, agitate, settle and draw steps.

The process of the invention provides a number of other advantages. The use of the quiescent zone in the primary treatment zone to control the concentration of solids in the first aqueous phase or partially-treated wastewater flowing from the primary treatment zone eliminates the need for downstream clarifier equipment. By so limiting the amount of solids entering the contact zone(s), each can oPerate with free settling, rather than hindered settling as is the case when large concentrations of suspended solids are present. Contacting the partially-treated wastewater containing a reduced concentration of susPended solids with a fresh adsorbent in the contact zone(s) improves removal of pollutants. Pollutants which are poorly adsorbed in the aeration zone and carried over into the contact zone(s) are contacted with fresh and more active adsorbent, thereby providing improved removal of these pollutants. The biologically active solids present in the partially-treated wastewater further metabolize pollutants in the contact zone(s), particularly when aeration with an oxygen-containing gas is used for agitation. The contact or agitation period and the settling period in the settling zone(s) can be conveniently adjusted to meet the requirements for the particular wastewater being treated. When a plurality of contact zones are used, the overall process can be operated continuously and each contact zone operated in a batch manner.

From the foregoing description, one skilled in the art can easily ascertain the essential characteristics of the invention and, without departing from the spirit and scope thereof, make various changes and modifications to adapt it to various usages.

We claim:

1. A Process for purifying wastewater containing organic and adsorbable Pollutants comprising the steps of:
   (a) providing a primary treatment zone including an aeration zone and a quiescent zone substantially isolated from and in continuous fluid communication with said aeration zone;
   (b) introducing the wastewater into said aeration zone;
   (c) continuously aerating the wastewater with an oxygen-containing gas in said aeration zone in the presence of sufficient amounts of a powdered adsorbent and biologically active solids to reduce the BOD, COD and TOC to desired levels, said thus-treated wastewater passinq from said aeration zone into said quiescent zone;
   (d) retaining said thus-treated wastewater in said quiescent zone for a sufficient time for solids therein to settle by gravity and produce a first solids phase and a first aqueous phase containing a maximum predetermined amount of said solids;
   (e) transferring said first aqueous phase from said quiescent zone into a contact zone;
   (f) agitating said first aqueous phase in said contact zone in the presence of a powdered adsorbent for an agitation period sufficient to reduce the BOD, COD and TOC to desired levels;
   (g) terminating agitation and allowing solids in said thus-treated first aqueous phase to settle by gravity for a settling period sufficient to produce a clarified, substantially solids-free, second aqueous phase and a second solids phase;

(h) thereafter withdrawing a predetermined amount of said second aqueous phase from said contact zone; and (i) repeating steps (e) through (h).

2. A process according to claim 1 wherein the total amount of adsorbent and biologically active solids present in said aeration zone is about 10 to about 50,000 parts per million parts of the wastewater.

3. A process according to claim 2 wherein the amount of said, adsorbent present in the aeration zone is about 5 to about 20,000 parts per million of the wastewater.

4. A process according to claim 3 wherein said adsorbent is activated carbon.

5. A process according to claim 3 wherein
said contact zone comprises a single tank including an inlet section and a mixing and settling section substantially isolated from and in continuous fluid communication with said inlet section;
in step (e) said first aqueous phase continuously flows from said quiescent zone of said primary treating zone into said inlet section at a first flow rate and passes therefrom into said mixing and settling section;
in steps (f) and (g) said agitation and settling is carried out in said mixing and settling section; and
in step (h) said second aqueous phase is withdrawn from said mixing and settling section at a second flow rate greater than said first flow rate until said predetermined amount of said second aqueous phase has been withdrawn.

6. A process according to claim 5 wherein step (f) is continued until the liquid level of said thus-treated first aqueous phase in said mixing and settling section reaches a predetermined per limit.

7. A process according to claim 6 wherein step (h) is continued until the liquid level of said second aqueous phase drops to a predetermined lower limit.

8. A process according to claim 5 wherein said agitation is carried out by introducing a pressurized oxygen-containing gas into said mixing and settling section.

9. A process according to claim 5 wherein said agitation is carried out by mechanical agitation means.

10. A process according to claim 5 including the step of adding a flocculation aid for promoting settling of said adsorbent to said first aqueous phase near the end of said agitation period.

11. A process according to claim 10 wherein said flocculation aid is a cationic polymer.

12. A process according to claim 5 including the step of recycling at least a portion of said second solids phase from said contact zone to said aeration zone.

13. A processing according to claim 12 including the step of withdrawing a portion of the mixed liquor solids phase from said primary treatment zone so as to maintain the amounts of said adsorbent and biologically active solids present in said aeration zone at predetermined levels.

14. A process according to claim 3 wherein
said contact zone comprises a plurality of tanks;
in step (e) said first aqueous phase flows from said quiescent zone of said primary treatment zone into one of said tanks for a predetermined fill period, then into a different one of said tanks for a predetermined fill period and this sequence is continued;
in step (f) said agitation is carried out in each of said tanks during and/or after said filling period therefor;
in step (g) said settling is carried out in each tank after termination of said agitation period therefor;
in step (h) said predetermined amount of said second aqueous phase is withdrawn from each of said tanks after completion of said settling period therefor and before commencement of the flow of said first aqueous phase from said quiescent zone thereinto.

15. A process according to claim 14 wherein step (e) is continued until the liquid level of said first aqueous phase in each of said tanks reaches a predetermined upper level.

16. A process according to claim 15 wherein step (h) is continued until the liquid level of said second aqueous phase drops to a predetermined lower limit.

17. A process according to claim 14 wherein said agitation is carried out by introducing a pressurized oxygen-containing gas into each of said tanks.

18. A process according to claim 14 wherein said agitation is carried out by mechanical agitation means in each of said tanks.

19. A process according to claim 14 including the step of adding to said first aqueous phase a flocculation aid for promoting settling of said adsorbent near the end of said agitation.

20. A process according to claim 19 wherein said flocculation aid is a cationic polymer.

21. A process according to claim 14 including the step of recycling at least a portion of said second solids phase from said contact zone to said aeration zone.

22. A process according to claim 21 including the step of withdrawing a portion of the mixed liquor solids from said primary treatment zone so as to maintain the amounts of said adsorbent and biologically active solids present in said aeration zone at predetermined levels.

* * * * *

UNITED STATES PATENT AND TRADEMARK OFFICE
CERTIFICATE OF CORRECTION

PATENT NO. : 4,810,386

DATED : March 7, 1989

INVENTOR(S) : William M. Copa and Thomas J. Vollstedt

It is certified that error appears in the above-identified patent and that said Letters Patent is hereby corrected as shown below:

<u>Column 1</u>, line 56, "singl" should be --single--.

<u>Column 2</u>, line 30, "adsorbabl" should be --adsorbable--.

<u>Column 4</u>, line 23, "wastewater" should be --wastewaters--;

line 42, "ca be" should be --can be--;

line 68, "ittroduced" should be --introduced--.

<u>Column 5</u>, line 45, "oxyqen-containing" should be --oxygen-containing--;

line 45, "throuqh" should be --through--.

<u>Column 8</u>, line 53, "passinq" should be --passing--.

<u>Column 9</u>, line 12, between "said" and "adsorbent", delete the comma (,);

line 22, "iolated" should be --isolated--;

line 28, "scction" should be --section--;

UNITED STATES PATENT AND TRADEMARK OFFICE
CERTIFICATE OF CORRECTION

PATENT NO. : 4,810,386

DATED : March 7, 1989

INVENTOR(S) : William M. Copa et al.

It is certified that error appears in the above-identified patent and that said Letters Patent is hereby corrected as shown below:

Column 9, line 40, "per" should be -- upper --.

Signed and Sealed this

Tenth Day of October, 1989

Attest:

DONALD J. QUIGG

*Attesting Officer*  *Commissioner of Patents and Trademarks*